Jan. 17, 1961  D. E. BAUS  2,968,490
DEMOUNTABLE RUNNING GEAR
Filed July 8, 1958  5 Sheets-Sheet 1

INVENTOR.
DONALD E. BAUS
BY
McMorrow, Berman & Davidson
ATTORNEYS

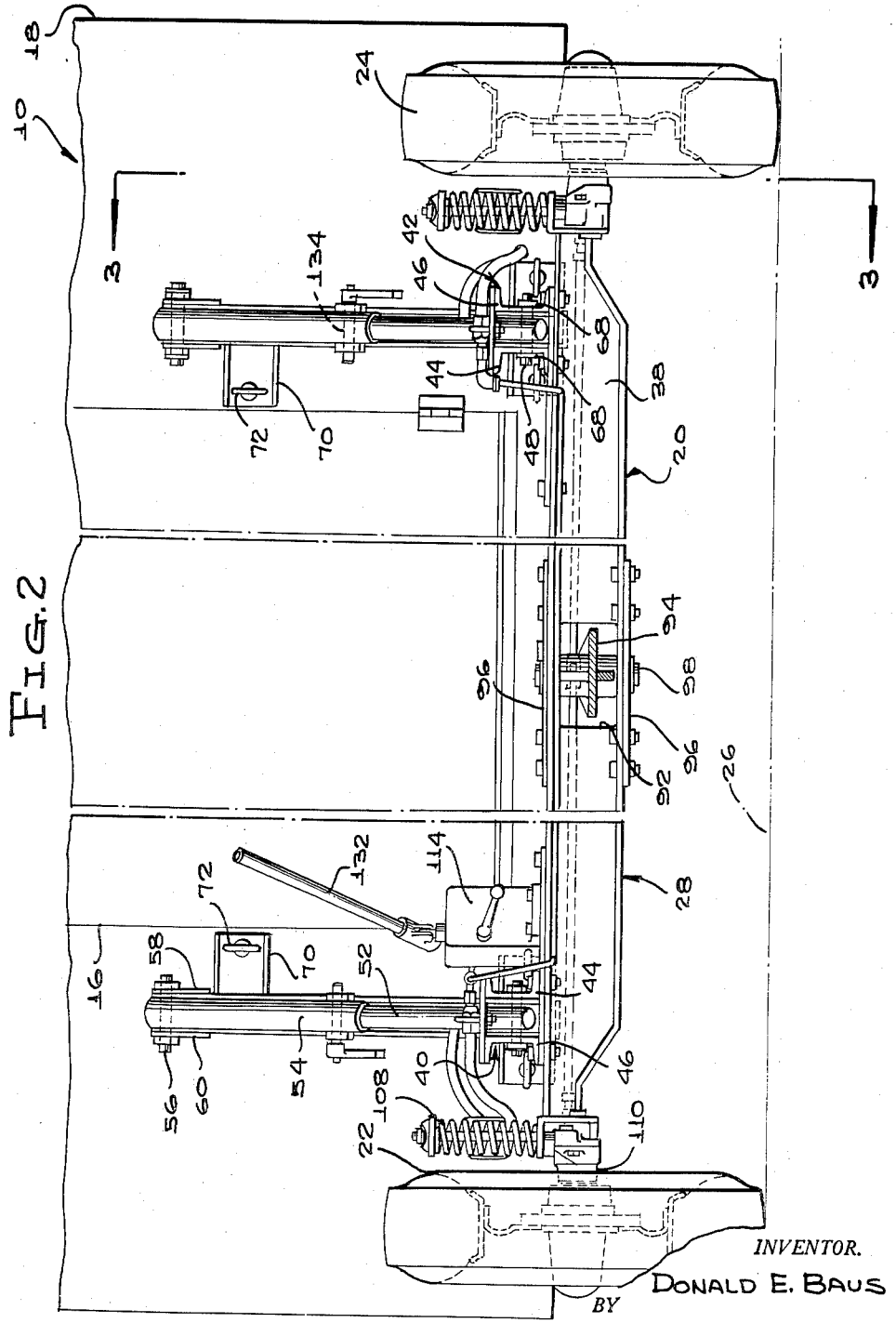

Jan. 17, 1961 D. E. BAUS 2,968,490
DEMOUNTABLE RUNNING GEAR
Filed July 8, 1958 5 Sheets-Sheet 3

INVENTOR.
DONALD E. BAUS
BY
McMorrow, Berman & Davidson
ATTORNEYS

Jan. 17, 1961 D. E. BAUS 2,968,490
DEMOUNTABLE RUNNING GEAR
Filed July 8, 1958 5 Sheets-Sheet 4

INVENTOR.
DONALD E. BAUS
BY
McMorrow, Berman & Davidson
ATTORNEYS

Jan. 17, 1961  D. E. BAUS  2,968,490
DEMOUNTABLE RUNNING GEAR
Filed July 8, 1958  5 Sheets-Sheet 5
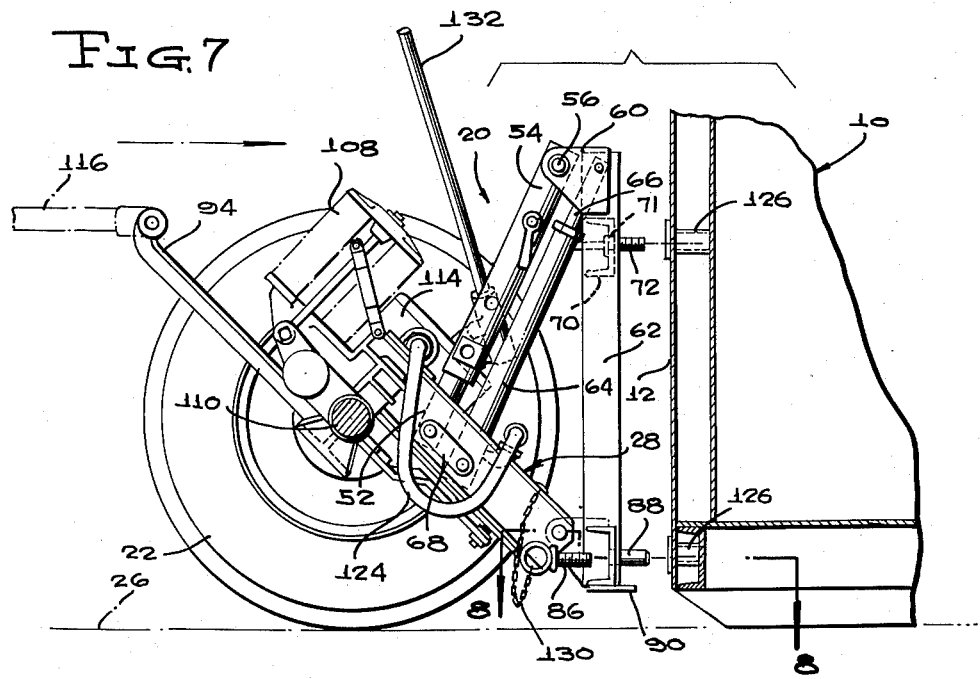
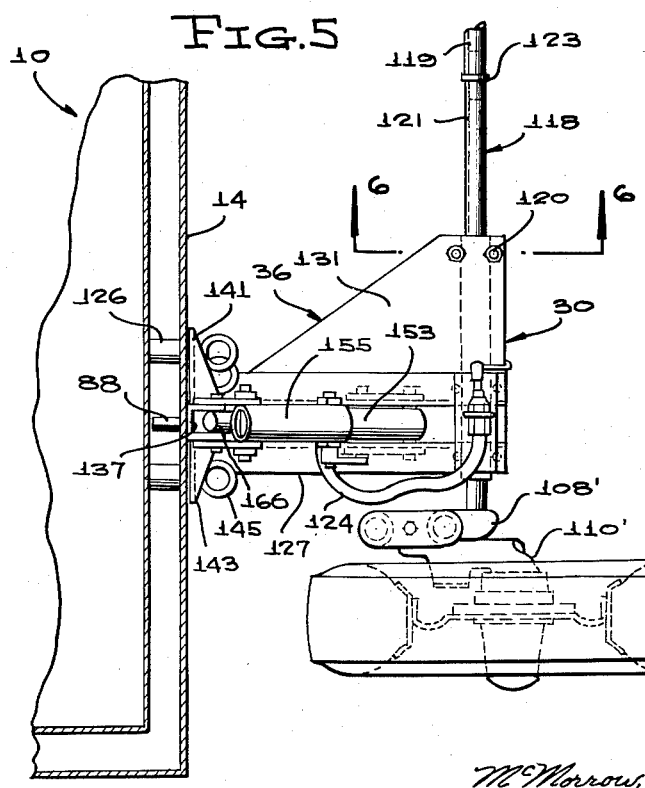
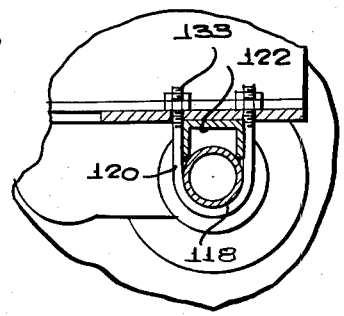
INVENTOR.
DONALD E. BAUS
BY
McMorrow, Berman + Davidson
ATTORNEYS

United States Patent Office 2,968,490
Patented Jan. 17, 1961

2,968,490

DEMOUNTABLE RUNNING GEAR

Donald E. Baus, Hyattsville, Md., assignor to Fred. S. Gichner Iron Works, Incorporated, Washington, D.C., a corporation of Delaware Filed July 8, 1958, Ser. No. 747,238

5 Claims. (Cl. 280—35)

The present invention relates to a demountable running gear for attachment to a body unit such as a shelter enclosure, or the like.

An object of the present invention is to provide a support which may be attached to or detached from a body unit with ease and facility.

Another object of the present invention is to provide a support having elevating and lowering means which may be attached to or detached from a body unit with ease and facility.

A further object of the present invention is to provide a running gear which lends itself to the ready conversion of a stationary body unit to a mobile body unit adapted for transport behind a towing vehicle.

A still further object of the present invention is to provide a running gear which requires the services of a single operator to attach to or detach from a body unit.

Yet another object of the present invention is to provide a running gear for attachment to a body unit, the running gear having elevating and lowering means for moving the body unit into and out of ground-surface-engaging positions.

A further object of the present invention is to provide a running gear for attachment to a body unit which is simple in structure, sturdy in construction, and economically feasible.

These and other objects and advantages of the present invention will be fully apparent from the following description when taken in conjunction with the annexed drawings, in which:

Figure 2 is a contracted view on an enlarged scale, taken on the line 2—2 of Figure 1;

Figure 5 is a view taken on the line 5—5 of Figure 3 with parts broken away;

Figure 6 is a view taken on the line 6—6 of Figure 5;

Figure 7 is a fragmentary elevational view partially in section of the front wheel and axle assembly, shown detached from the adjacent portion of a body unit.

Figure 1:
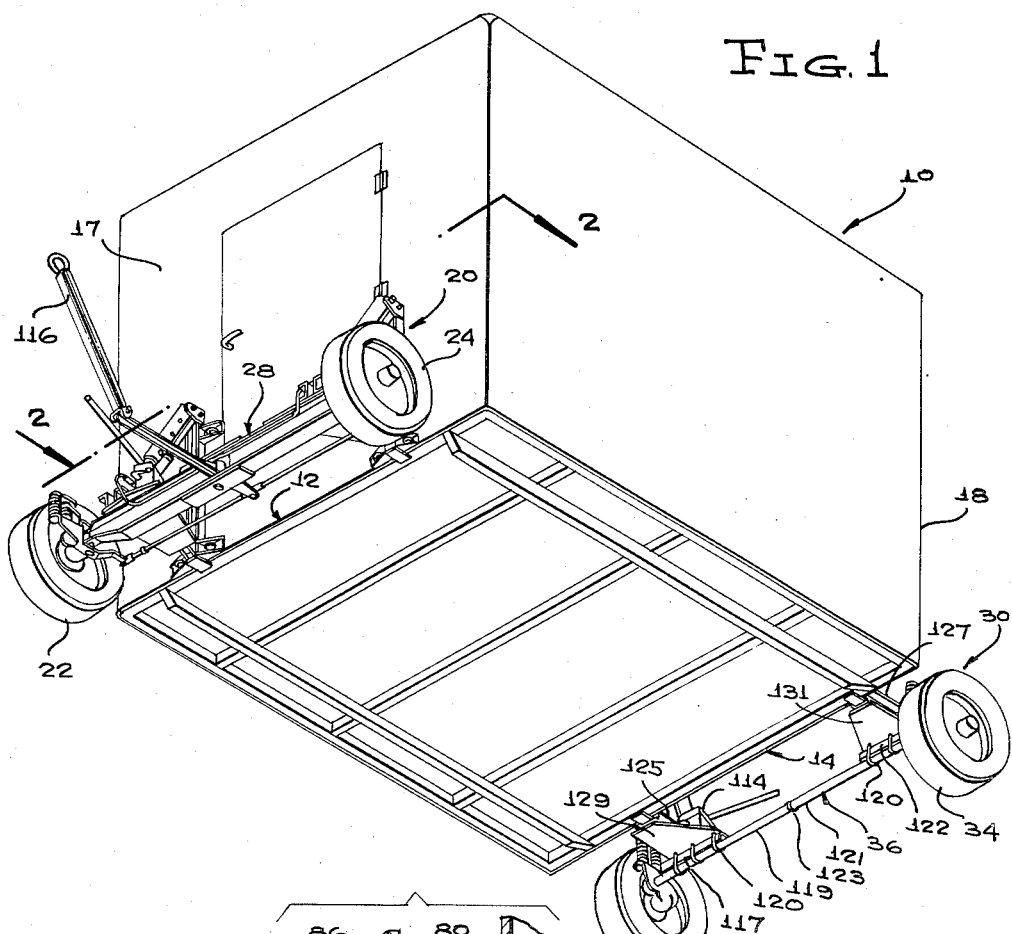
Figure 1 is an isometric view, of the running gear of the present invention attached to a body unit; looking upwardly toward the bottom of the body unit.

Referring in greater detail to the drawings in which like numerals indicate like parts throughout the several views, the reference numeral 10 designates a body unit of the portable shelter type, having a forward end 12, a rearward end 14, spaced sides 16 and 18, and spaced forward and rearward walls 17 and 19, respectively.

Figure 3:
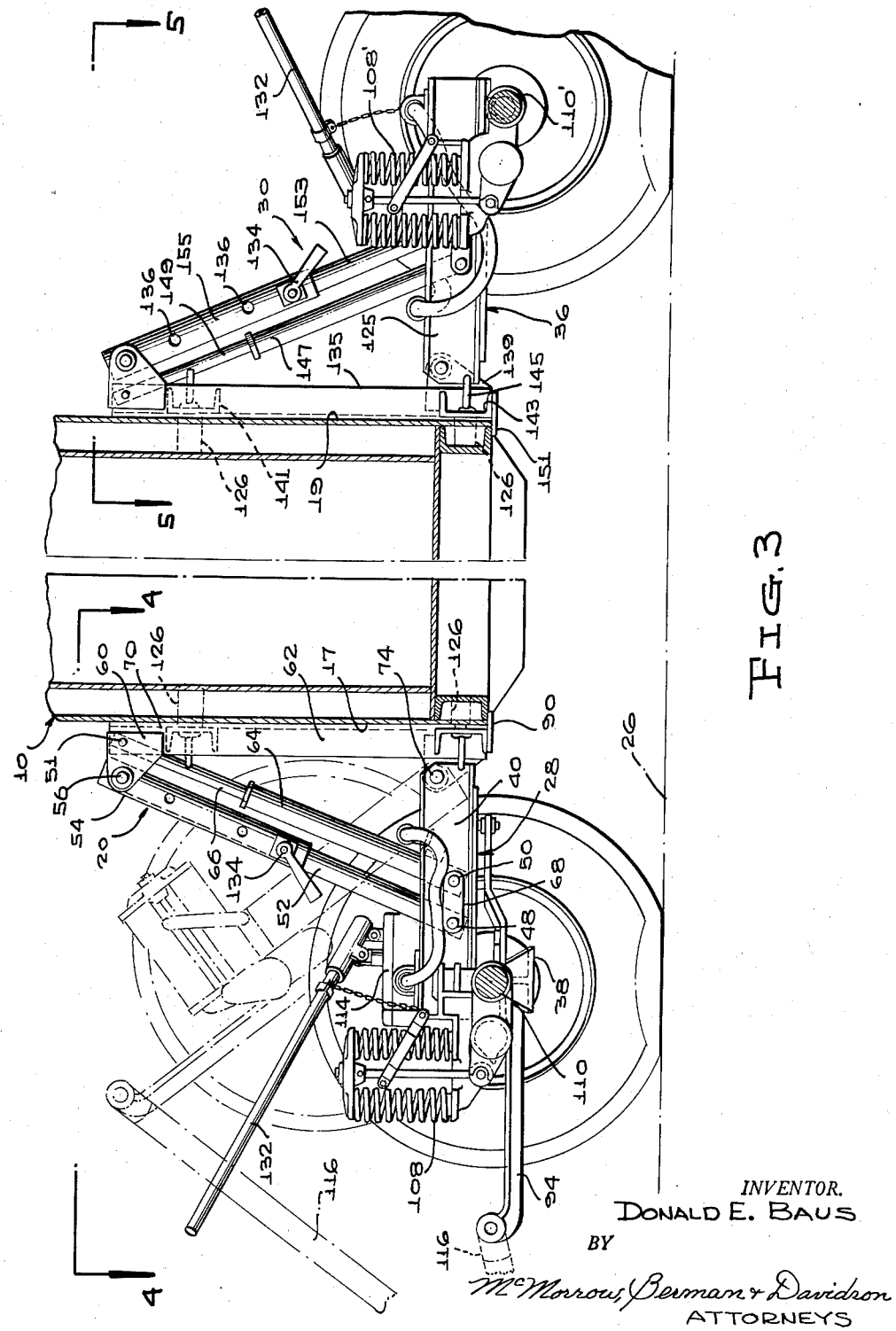
Figure 3 is a contracted view taken on the line 3—3 of Figure 2, with parts broken away.

A front wheel and axle assembly 20 is positioned adjacent the forward end 12 of the body unit 10 with the wheels 22 and 24 thereof in parallel spaced relation with respect to each other. As shown in Figures 2 and 3, the wheels 22 and 24 engage a ground surface 26. The front wheel and axle assembly 20 includes a normally horizontally disposed frame 28.

A rear wheel and axle assembly 30 is positioned adjacent the rearward end 14 of the body unit 10 with the wheels 32 and 34 thereof in parallel spaced relation with respect to each other and with such wheels 32 and 34 engaging the ground surface 26. The rear wheel and axle assembly 30 includes a horizontally disposed frame 36.

The front and rear wheel and axle assemblies 20, 30, form a support or running gear for converting the stationary body unit 10 into a mobile unit.

Figure 4:
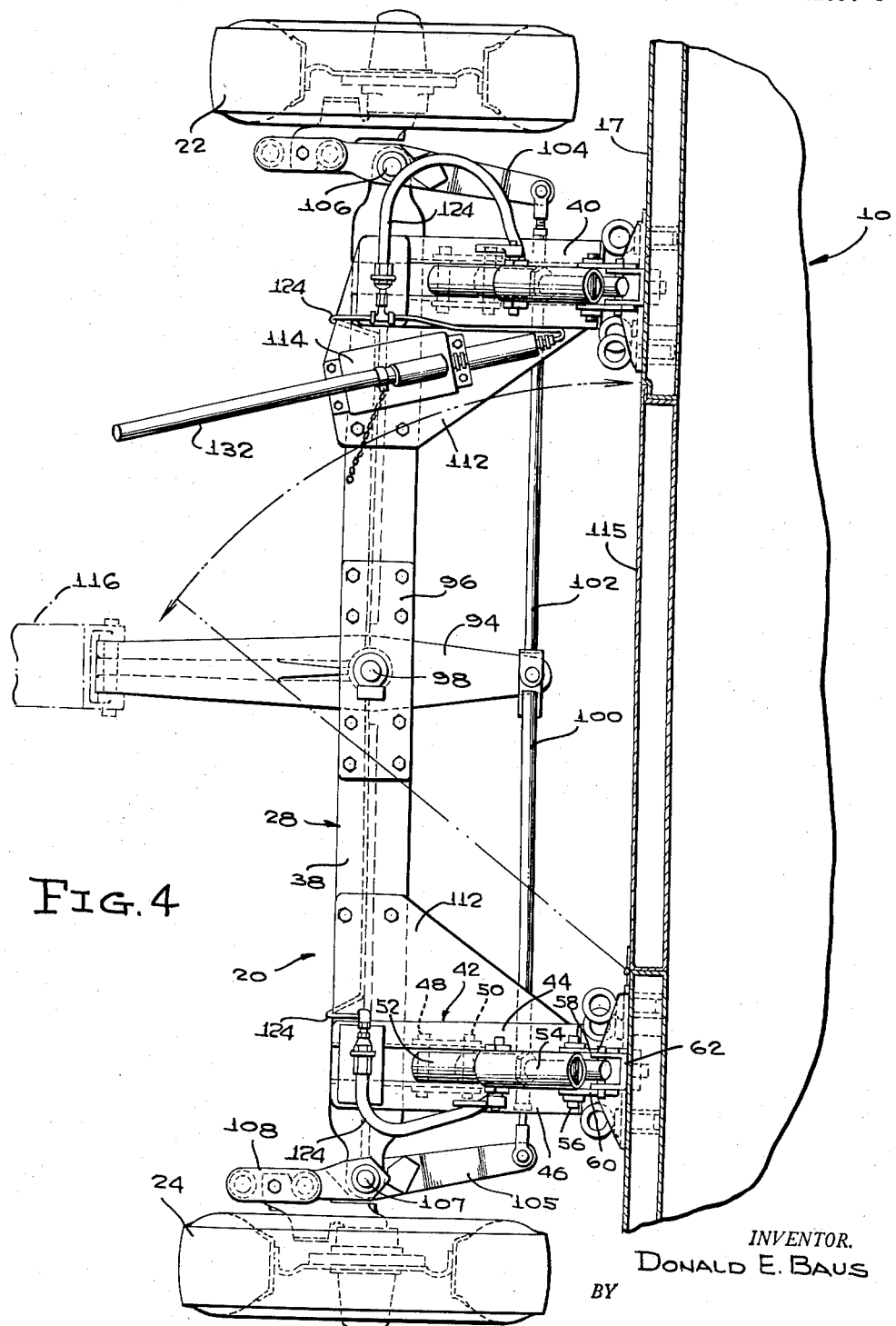
Figure 4 is a view taken on the line 4—4 of Figure 3.

Referring to Figures 2, 3, and 4, the frame 28 of the front wheel and axle assembly 20, supported by the laterally spaced ground-engaging wheels 22 and 24, includes a transversely arranged beam 38. A pair of longitudinally extending auxiliary beams or supports 40 and 42 project rearwardly from the beam 38 inwardly of the ends thereof. Each of the auxiliary beams 40 and 42 is fabricated of identical components including horizontally disposed channel members 44 and 46 arranged in spaced back to back relation with portions of their lower flanges adjacent the forward ends fixedly secured, by rivets or other suitable means, to the upper flange of the beam 38 which is an I-beam in configuration.

The components carried by the channel members 44 and 46 of the auxiliary beams 40 and 42 are identical and will be described with reference only to the components of the auxiliary beam 42.

A pair of pivot pins 48 and 50 are arranged in parallel spaced relation transversely of the auxiliary beam 42 and each pin 48 and 50 has the portion inwardly of its end mounted in the webs of the channel members 44 and 46, the pins 48 and 50 being shown in dotted lines in Figure 4. The pin 48 extends through and pivotally supports the lower end of an inner tubular member 52 telescopically arranged within an outer tubular member 54 which has its upper end connected by a pivot pin 56 to vertically disposed plate members 58 and 60 carried exteriorly of and fixedly secured to the upper end portions of the flanges of a vertically disposed supporting arm or channel member 62 facing toward the beam 38.

The pin 50 extends through the closed lower end portion of a hydraulic cylinder 64 which has its actuating arm 66 extending from the upper end thereof and pivotally connected by another pin 51 at the free end thereof to the flanges of the channel member 62 adjacent the upper end of the latter.

Fastening plates 68 extend over the projecting end portions of the pivot pins 48 and 50 and abuttingly engage the inner faces of the webs of the channel members 44 and 46, and serve as anchoring elements for the pins 48 and 50.

Projecting perpendicularly from one side of the channel member 62 adjacent the upper end, as best seen in Figures 2 and 7 is a horizontally disposed short channel member 70 having its web coplanar with the web of the channel member 62 and having an aperture 71 therethrough receiving a hand bolt 72, the threaded portion of the latter projecting rearwardly of the channel member 62.

Figure 8:
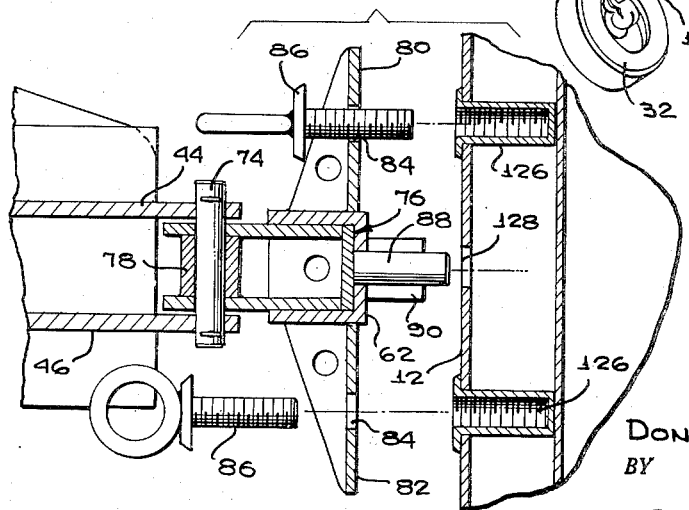
Figure 8 is a view on an enlarged scale, taken on the line 8—8 of Figure 7.

A horizontally disposed pivot pin 74, Figure 3, extends through aligned holes provided in the webs of the channel members 44 and 46 of each of the auxiliary beams 40 and 42 inwardly of the ends of such channel members 44 and 46 remote from the beam 38. As shown in Figure 8, a U-shaped support member 76 is positioned within and fixedly secured to the lower end portion of the channel member 62 and has the free ends of its legs projecting outwardly of the flanges of the channel member 62. A reinforcing sleeve 78 is carried between and fixedly secured to the legs of the support member 76 with its open ends in registry with suitable openings provided in the legs of the member 76 for receiving therein the intermediate portion of the pivot pin 74. Triangularly-shaped sections 80 and 82 of channel stock are secured to the exterior faces of the flanges of the channel member 62 adjacent the support member 76 and project horizontally therefrom. The sections 80 and 82 are provided with apertures 84 through which extend other hand bolts 86 normally having their threaded end portions rearwardly of the web of the channel member 62. A positioning pin 88 projects rearwardly from the bight of the support member 76. A plate 90, constituting a ledge or shelf, extends over the lower end of the channel member 62 and projects rearwardly therefrom, as shown in Figure 7.

The hydraulic cylinders 64, the actuating arms 66, pivot pins 50 and 51, plate members 58 and 60, the webs of the beams 40 and 42, together with the pivot pins 74 and the support members 76, constitute means on the frame 28 operatively connected to the supporting means or channel members 62 for effecting the movement of the supporting means or channel members 62.

Referring to Figures 2 and 4, the midportion of the web of the beam 38 is provided with an opening 92 through which extends the intermediate portion of a draw bar 94. Reinforcing plates 96 extend over the upper flange and under the lower flange of the beam 38 and serve to strengthen the midsection of the beam 38. A vertically disposed pivot pin 98 extends through the plate 96, through the flanges of the beam 38, and through the adjacent portion of the draw bar 94 and connects the draw bar 94 to the beam 38 for swinging movement about the pin 98 as a vertical axis. The portion of the draw bar 94 adjacent its rearward end is pivotally connected to the adjacent ends of a pair of tie rods 100 and 102 which are arranged in end to end relation and have their remote ends pivotally attached to steering arms 104 and 105 mounted on spindles 106 and 107 carried by the ends of the beam 38 for limited swinging movement about the spindles 106 and 107 as vertical axes. The portion of each of the arms 104 and 105 forwardly of the beam 38 carries a conventionally arranged spring assembly 108 operatively connected to and supporting the stub axle 110 which rotatably supports the adjacent one of the wheels 22 or 24.

The forward end portion of the draw bar 94 is pivotally connected to a tongue 116 for swinging movement of the tongue 116 about a horizontal axis, and can thereby be adjusted to the height of a conventional towing connection on a prime mover or towing vehicle.

As shown in Figure 4, a reinforcing web 112 extends between each of the auxiliary beams 40 and 42 and the adjacent portion of the beam 38, the web 112 associated with the beam 40 carrying a hand-operable hydraulic pump 114.

The pump 114 is positioned so as to permit the opening and closing of a door 115 hingedly mounted in the forward wall 17 of the body unit 10.

The rear wheel and axle assembly 30 is similar in construction to the front wheel and axle assembly 20 but is non-steerable and is modified accordingly.

Referring to Figures 1, 3, 5, and 6, the frame 36 of the assembly 30 is mounted for pivotal movement and includes an axle 118 having a pair of tubes 119 and 121 aligned in end to end relation with a spacer 123 extending between and carried within the adjacent ends of the tubes 119 and 121.

Downwardly facing channel members 117 and 122 are fixedly secured to and partially embrace the upper portion of the tubes 121 and 119, respectively, adjacent the remote ends, as shown in Figure 5 in connection with the tube 121.

Forwardly projecting auxiliary beams 125 and 127 are carried by webs 129 and 131 which are mounted upon the tubes 119 and 121 by U-shaped bolts 120 having their free ends extending through the webs and secured therein by nuts 133, as will be seen in Figures 1 and 6.

Each beam or support 125, 127, carries support arms and operating means which are identical to the support arms and operating means on the beams 40 and 42 of the front wheel and axle assembly 20. Briefly, each of such support arms includes an upstanding channel member 135, 137 having its lower end pivotally connected to the corresponding beams 125, 127 through plates 139. Projecting sections of channel stock 141 and 143 are carried by the upper and lower ends respectively of the channel members 135, 137 and are provided with apertures through which extend hand bolts 145.

Telescopingly arranged tubular members 153 and 155 extend between each of the beams 125, 127 and the corresponding channel members 135, 137.

A hydraulic cylinder 147 is carried on and has its lower end pivotally mounted in the corresponding beam 125, 127. Only the hydraulic cylinder 147 associated with the beam 125 is shown. The actuating arm 149 extends from the upper end of the hydraulic cylinder 147 and has its free end pivotally secured to plates carried by the upper end of each of the channel members 135 and 137.

A plate 151, constituting a ledge or shelf, projects forwardly from each channel member 135, 137.

Each of the tubes 119 and 121 has its remote end secured to a conventional spring assembly 108' which is operatively connected to and supported by a stub axle 110'. Each stub axle 110' rotatably supports the adjacent one of the wheels of the rear wheel and axle assembly.

A hydraulic pump is also mounted on the rear wheel and axle assembly in the same manner as in the front wheel and axle assembly and is operatively connected to each hydraulic cylinder of the rear wheel and axle assembly for effecting the movement of the frame 36 from a position where the plate 151 is adjacent to or rests upon the ground to an operating position where the plate 151 is raised above the ground, as seen in Figure 3.

The body unit 10 is provided on its front and rear walls 17, 19 with threaded sockets 126 to receive the hand bolts 72, 86, and 145, and with holes 128 to receive the positioning pins 88, as shown in Figures 3, 7, and 8.

In use, the running gear consisting of the assemblies 20 and 30 may be employed to convert a body unit 10 from a stationary unit to a mobile unit. The assemblies 20 and 30 are separately attachable to the forward end 12 and rearward end 14 of such a body unit 10, respectively, by the application of a manual or other type of pushing force to wheel the assemblies 20 and 30 to their proper positions with the positioning pins 88 in alignment with the proper holes 128 in the body unit 10, as shown in Figure 7, with reference to the front wheel assembly 20. The hand bolts 72, 86, and 145, are usually made captive by conventional means such as a chain 130 and, when the positioning pins 88 have been inserted within the respective holes 128, the bolts 72, 86, and 145 may be turned in their respective sockets 126 to fixedly secure the assemblies 20 and 30 on the body unit 10. With the assemblies 20 and 30 fixed to the ends 12 and 14 of the body unit 10, the handles 132 of the pumps 114 are manually manipulated to effect the transfer of fluid under pressure through the conduits 124 to the respective hydraulic cylinders 64 and 147 to cause the extension of the respective actuating arms 66 and 149, raising the body unit 10 above the ground surface and supporting the same upon the wheels 22 and 24, 32 and 34.

When the body unit 10 is raised above the ground surface 26, the assemblies may be locked in a selected position by the insertion of a pin 134 in one of the lower two holes of three holes 136 provided in the tubular members 54 and 155 when such hole is in registry with a hole provided in the tubular members 52 and 153, respectively, inwardly of the upper ends of the latter. The uppermost hole 136 is used for retaining the assemblies in retracted position for ease of handling while mounting, demounting, storing, etc.

A towing vehicle may then be attached to or an individual may grasp the free end of the tongue 116 and the body unit 10 moved over the ground surface to a new location or place of storage as desired.

While the wheel and axle assemblies 20 and 30 of the present invention have been shown and described as used with a body unit 10 of the shelter type, it is not intended that the wheel assemblies 20 and 30 be restricted in their use to such a type of body unit, but that any platform, structure, open frame, or other enclosure or structure may be transported by the running gear of the present invention constituting the wheel and axle assemblies 20 and 30 with ease and dispatch when such structures are provided with the proper sockets 126 and holes 128 for the bolts and positioning pins, respectively, or otherwise clamped or fastened to such assemblies.

What is claimed is:

1. A demountable running gear for use with a body unit to be transported over a ground surface, said running gear including a pair of spaced wheels and an axle rotatably supported by said wheels, a pair of spaced supports mounted on said axle for pivotal movement toward and away from a ground surface about the axis of said axle and having end portions projecting laterally from said axle in the same direction, an upstanding support arm positioned adjacent the free end of said projecting end portions of each of said supports and having its lower end pivotally connected to the adjacent end portion of said supports, a ledge projecting from the lower end portion of said supports and adapted to receive and support a body unit, a hydraulic jack extending between each of said supports and the corresponding one of said support arms with one end pivotally connected to the upper end of the corresponding one of said support arms and having its other end pivotally connected to the corresponding one of said supports, a positioning pin projecting from each of said support arms and adapted to be received in sockets provided in a body unit, fasteners carried by said support arms and adapted to be connected to complemental means provided on a body unit, and locking means on each support and connected to the corresponding one of each of said support arms for maintaining said supports and said support arms in a selected position.

2. A demountable running gear for use with a body unit to be transported over a ground surface, said running gear including a pair of spaced wheels and an axle rotatably supported by said wheels, a pair of spaced supports mounted on said axle for pivotal movement toward and away from a ground surface about the axis of said axle and having end portions projecting laterally from said axle in the same direction, an upstanding support arm positioned adjacent the free end of said projecting end portions of each of said supports and having its lower end pivotally connected to the adjacent end portion of said supports, a ledge projecting from the lower end portion of said supports and adapted to receive and support a body unit, a hydraulic jack extending between each of said supports and the corresponding one of said support arms with one end pivotally connected to the upper end of the corresponding one of said support arms and having its other end pivotally connected to the corresponding one of said supports, means for attaching said running gear to a body unit, and locking means on each support and connected to the corresponding one of each of said support arms for maintaining said supports and said support arms in a selected position.

3. A demountable running gear as defined in claim 2, and pump means mounted on said running gear operatively connected to said hydraulic jack.

4. A demountable running gear for use with a body unit to be transported over a ground surface, said running gear comprising a pair of wheel and axle assemblies arranged in spaced tandem relation and adapted to receive therebetween a body unit, each of said assemblies having a pair of spaced wheels and an axle rotatably supported by said wheels, a pair of spaced supports mounted on each of said axles for pivotal movement toward and away from a ground surface about the axis of said axle and having end portions projecting laterally from said axle in the same direction, an upstanding support arm positioned adjacent the free end of said projecting end portions of each of said supports and having its lower end pivotally connected to the adjacent end portion of said supports, a ledge projecting from the lower end of each of said support arms and adapted to receive and support a body unit, a hydraulic jack extending between each of said supports and the corresponding one of said support arms with one end pivotally connected to the upper end of the corresponding one of said support arms and having its other end pivotally connected to the corresponding one of said supports, a positioning pin projecting from each of said support arms and adapted to be received in sockets provided in a body unit, fasteners carried by said support arms and adapted to be connected to complemental means provided on a body unit, and locking means on each support and connected to the corresponding one of each of said support arms for maintaining said supports and said support arms in a selected position.

5. In combination with a body unit to be transported over a ground surface and having a forward wall and a rearward wall, a demountable running gear including a first wheel and axle assembly positioned adjacent to the forward wall of said body unit, a second wheel and axle assembly positioned adjacent to the rearward wall of said body unit, each of said assemblies having a pair of spaced wheels and an axle rotatably supported by said wheels, a pair of spaced supports mounted on each of said axles for pivotal movement toward and away from a ground surface about the axis of said axle and having end portions projecting laterally from said axle toward said body unit, an upstanding support arm positioned adjacent the free end of said projecting end portions of each of said supports and having its lower end pivotally connected to the adjacent projecting end portion of said supports, a ledge projecting from the lower end of each of said support arms for receiving and supporting a portion of the adjacent end of said body unit, a hydraulic jack extending between each of said supports and the corresponding one of said support arms with one end pivotally connected to the upper end of the corresponding one of said support arms and having its other end pivotally connected to the corresponding one of said supports, a positioning pin projecting from each of said support arms and receivable in sockets provided in said body unit, fasteners carried by said support arm and detachably connectable to complemental means on said body unit, and locking means on each support connected to the corresponding one of each of said support arms for maintaining said supports and support arms in a selected position.

References Cited in the file of this patent

UNITED STATES PATENTS

| | | |
|---|---|---|
| 1,693,700 | McCall et al. | Dec. 4, 1928 |
| 2,116,825 | Crescent et al. | May 10, 1938 |
| 2,200,504 | Keen | May 14, 1940 |
| 2,521,819 | Baer | Sept. 12, 1950 |
| 2,785,814 | Corley | Mar. 19, 1957 |
| 2,798,729 | Paul | July 9, 1957 |

FOREIGN PATENTS

| | | |
|---|---|---|
| 872,432 | Germany | Apr. 2, 1953 |